March 27, 1962     M. W. HERZOG     3,027,001
DISPLAY CONTAINER WITH INSERTION MEANS FOR TUBULAR ARTICLES
Filed March 5, 1959     6 Sheets-Sheet 1

MILTON W. HERZOG
INVENTOR.

ATTORNEY

March 27, 1962  M. W. HERZOG  3,027,001
DISPLAY CONTAINER WITH INSERTION MEANS FOR TUBULAR ARTICLES
Filed March 5, 1959  6 Sheets-Sheet 2

MILTON W. HERZOG
INVENTOR.

ATTORNEY

March 27, 1962 M. W. HERZOG 3,027,001
DISPLAY CONTAINER WITH INSERTION MEANS FOR TUBULAR ARTICLES
Filed March 5, 1959 6 Sheets-Sheet 3

MILTON W. HERZOG
INVENTOR.

ATTORNEY

March 27, 1962 M. W. HERZOG 3,027,001
DISPLAY CONTAINER WITH INSERTION MEANS FOR TUBULAR ARTICLES
Filed March 5, 1959 6 Sheets-Sheet 4

MILTON W. HERZOG
INVENTOR.

BY
ATTORNEY

March 27, 1962     M. W. HERZOG     3,027,001
DISPLAY CONTAINER WITH INSERTION MEANS FOR TUBULAR ARTICLES
Filed March 5, 1959     6 Sheets-Sheet 6

MILTON W. HERZOG
INVENTOR.

ATTORNEY

United States Patent Office 3,027,001
Patented Mar. 27, 1962

3,027,001
DISPLAY CONTAINER WITH INSERTION MEANS
FOR TUBULAR ARTICLES
Milton W. Herzog, Valley Stream, N.Y., assignor to Delamere Company, Inc., New York, N.Y., a corporation of Delaware
Filed Mar. 5, 1959, Ser. No. 797,521
6 Claims. (Cl. 206—45.31)

This invention relates to display containers, or cartons, and is particularly directed to display containers for use with tubular, or cylindrical objects of various types, the container having means formed therein, to enable the individual tubular objects to be inserted thereinto, while the container is substantially in its normal position, with a minimum of distortion of the panels thereof.

It is primarily directed to hollow containers in each of which a plurality of axially flexible and circumferentially rigid, or substantially rigid, tubular or cylindrical objects are supported and displayed, means being provided for inserting the individual cylindrical objects into their normal display position through an opening one of the panels of the container, with a minimum of distortion of the panels of the container during the insertion of the tubular, or cylindrical objects.

The display container, which is constructed in various types and modifications is adapted to support and locate a plurality of tubular, or cylindrical objects, in such manner, that a portion of each of said tubular, or cylindrical objects projects through a cutout of substantially rectangular contour through one of the panels of the container, beyond the outer surface of the wall or panel, to enable a purchaser to examine the article displayed without opening, or otherwise disturbing the container, or its contents, means being provided in the panels of the container to enable the various objects to be inserted therein, either without disturbing or distorting the panels of the container, or with a minimum of distortion of the panels, so that after the objects are inserted into their display position, within the container, the objects inserted therein are spacedly supported and accurately located relative to one another.

Various types of containers are provided to support and display various types of tubular or cylindrical objects, including substantially tubular articles such as hair rollers, which consist essentially of a wrapped coiled compression spring, or other type of tubular, or cylindrical object which is axially flexible, to enable the object to be bent along its longitudinal axis, the outer diameter of the object being held substantially constant and circular during the insertion of the object into the interior of the container, the axial flexibility of the object enabling the object to assume its normal externally cylindrical attitude after it is inserted into the container.

A modification of the display container is adapted to receive and support a modified type of tubular, or cylindrical object, which is substantially rigid both longitudinally and circumferentially, the container being so constructed that the tubular objects may be individually inserted thereinto, with a minimum of distortion of the various panels of the container, so that the panels of the container assume their normal position after the tubular objects are inserted therein, the tubular objects being spacedly located relative to one another, and supported by the panels of the container.

A primary feature of the various modifications of the container is that they are formed of relatively thin fairly rigid coated paper, or sheet plastic material, which is relatively inexpensive, the thickness of the paper being normally of the order of .015, or thereabouts, the actual thickness being determined by the size of the container and the degree of flexibility of the various panels thereof, the containers being blanked and formed by conventional means at relatively low cost.

Another feature of the display container is that essentially the same type of container can be produced in a wide range of sizes and widths, so that each container will accommodate a particular size of tubular, or cylindrical object, the appearance of the containers in the display position being relatively uniform.

Another feature of the construction is that the tubular objects may individually be inserted into the container, while the container is held in its normal open position, by a relatively unskilled operator, the container either maintaining its normal cross-sectional contour during the insertion of the objects, or reassuming its normal contour after the tubular articles are inserted therein.

Another feature of the invention is that the container is so constructed that one or more individual tubular articles may be supported within an individual container, the container supporting and diametrically spacing the tubular articles in such a manner that they retain their normal position, during shipping and handling, no separate spacers or retainers being required.

The accompanying drawings, illustrative of one embodiment of the invention, and several modifications thereof, together with the description of their construction and the method of operation, fitting, insertion, and utilization thereof, will serve to clarify further objects and advantages of the invention.

In the drawings:

FIGURE 4 represents an enlarged cross-section through the display container, shown in FIGURES 1, 2 and 3, with the rear panel shown at the top, showing the method of inserting one of the axially flexible tubular objects into the container, through one of the filler openings through the rear panel shown in FIGURE 3, the tubular object being angularly positioned and bent along an arcuate line, about its longitudinal axis to facilitate its insertion through the filler opening through the rear panel, the sections of the rear panel being shown in slightly distorted position along arcuate lines, relative to their normal position, the sections of the rear panel being moved by the circumferential outer surface of the tubular object, the side panels being drawn angularly inward by the distortion of the adjoining sections of the rear panel, the tubular object being shown in its normal fully inserted position, such as that shown in FIGURES 1 and 2, with the rear panel and the two side panels restored to their normal perpendicular relationship, in dot-dash lines, the section being taken on the line 4—4, FIGURE 3.

FIGURE 5 is an enlarged cross-section, similar to FIGURE 4, through a modification of the display container shown in FIGURES 1, 2 and 4, the filler opening through the rear panel, shown in FIGURE 3, being lengthened to enable the axially flexible tubular object to be inserted into the interior of the container, while the sections of the rear panel of the container are close to their normal flat position, such as that shown in FIGURE 2, the tubular object being angularly positioned and bent along an arcuate line about its longitudinal axis, to enable it to be inserted into its normal position within the container, the tubular object in its normal inserted position being shown in dot-dash lines, with a portion of the circumferential outer surface of the tubular object projecting through the one of the rectangular cutouts, beyond the outer surface of the front panel of the container.

FIGURE 8 is an enlarged cross-section, similar to those shown in FIGURES 4 and 5, through the modified display container, shown in FIGURES 6 and 7, showing the axially flexible tubular object during the process of insertion into the interior of the container, through one of the oval filler openings shown in FIGURE 7, the sections of the rear panel being shown in distorted positions, moved slightly outward along arcuate lines, by the circumferential outer surface of the tubular object, the side panels being angularly displaced inward by the displacement of the sections of the rear panel, the rear panel and the side panels being shown restored to their normal positions in dot-dash lines, when the tubular article is in its normal position, inserted into the interior of the container, the section being taken on the line 8—8, FIGURE 7.

FIGURE 13 is a partial longitudinal section, and partial side elevational view, similar to FIGURE 2, of another modification of the display container, which is shown in FIGURES 14, 15 and 16, the container being adapted to support a plurality of axially rigid tubular objects, such as that shown in FIGURES 14 and 16, showing the tubular objects fitted to the interior of the container, with a portion of the circumferential outer surface of each of the tubular objects projecting beyond the outer surface of the front panel of the container, through the rectangular cutouts therethrough, and indicating the method of spacedly locating the tubular objects relative to one another, by means of the edges of the rectangular cutouts through the front panel, the view and section being taken on the line 13—13, FIGURE 14.

FIGURE 16 is an enlarged cross-section, similar to FIGURE 4, through the modified display container shown in FIGURES 13, 14 and 15, with the rear panel shown at the top, showing the method of inserting one of the axially rigid tubular objects into the interior of the container, the longitudinal axis of the tubular object being substantially straight and angularly positioned relative to the front panel of the container, the sections of the rear panel of the container being shown displaced outward along a pair of arcuate lines by the pressure of the circumferential outer surface of the tubular object, against the inner surface of the rear panel, the side panels shown drawn angularly inward by the displaced sections of the rear panel, the rear panel and the two side panels being shown restored to their normal position, with the side panels substantially perpendicular to the forward panel, in dot-dash lines, after the tubular object is completely inserted into the interior of the container, with a portion of the circumferential outer surface of one of the tubular objects projecting through one of the rectangular cutouts, beyond the outer surface of the front panel, shown in dot-dash lines.

It will be understood that the following description of the construction and the method of fitting, insertion and utilization of the display container for tubular objects is intended as explanatory of the invention and not restrictive thereof.

In the drawings, the same reference numerals designate the same parts throughout the various views, except where otherwise indicated.

Figure 1:
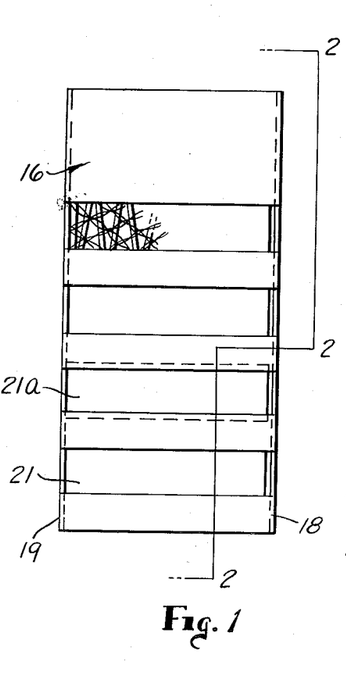
FIGURE 1 is a front elevational view of one embodiment of the display container, with a plurality of longitudinally flexible tubular objects fitted thereof, showing a portion of the circumferential outer surface of the tubular objects projecting through the equally-spaced cutouts of substantially rectangular contour, through the front panel of the container.
Figure 2:
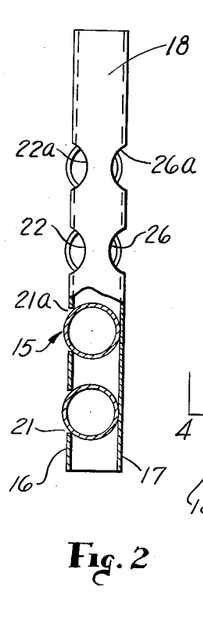
FIGURE 2 is a partial longitudinal section and partial side elevational view of the embodiment of the display container, shown in FIGURE 1, showing the tubular objects fitted to the interior of the container, and the method of spacedly locating the tubular objects relative to one another and supporting them within the container, also the arcuate slots through the side panel, which are axially aligned with the rectangular cutouts and the filler openings through the corresponding container panels, shown in FIGURES 1 and 3, respectively, the view and section being taken on the line 2—2, FIGURE 1.
Figure 3:
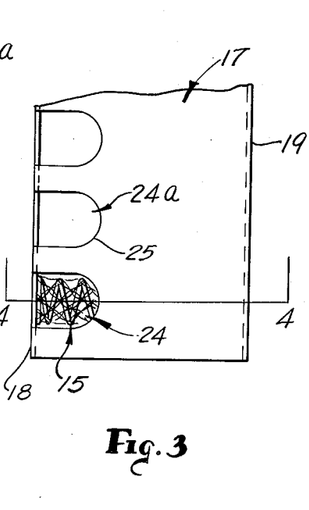
FIGURE 3 is a rear elevational view of the display container shown in FIGURES 1 and 2, showing the filler openings through the rear panel, through which the tubular objects are inserted into the container in the manner shown in FIGURES 4 and 5.

One embodiment of the container, which is shown in FIGURES 1, 2 and 3, is used for supporting and displaying axially flexible tubular, or cylindrical objects 15, such as that shown in FIGURES 1, 2, 4 and 17.

Figure 4:
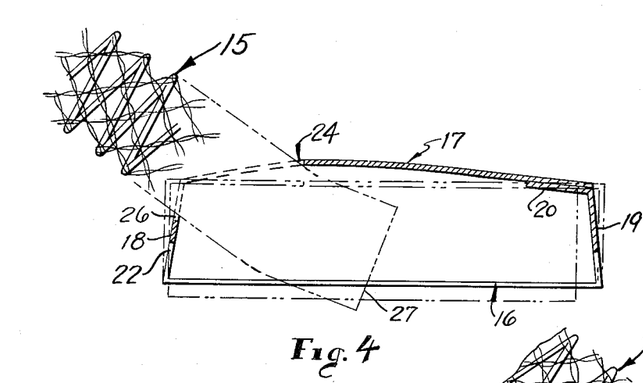
Figure 5:
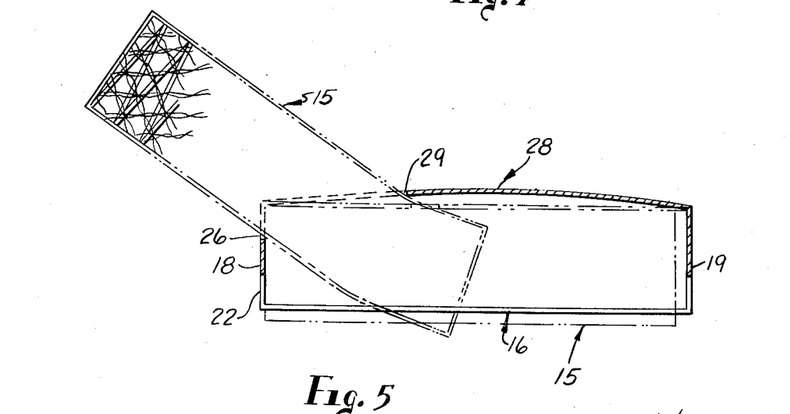

The display container which is made of relatively thin coated paper, or other type of paper, or a sheet plastic material, which while fairly rigid, is flexible to such an extent that individual panels of the container may be angularly displaced to some degree, in the manner shown in FIGURES 4 and 5, the panel being restored to its normal position after the tubular object 15 is inserted into the container, in its normal position, shown in dot-dash lines in FIGURE 4.

Figure 17:
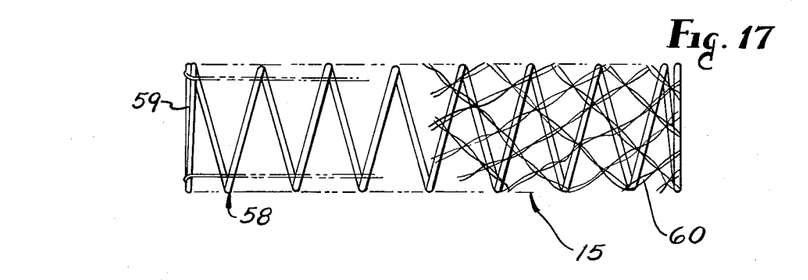
FIGURE 17 is a partial longitudinal section, and partial front elevational view of an axially flexible hair roller, which represents one type of axially flexible tubular object inserted into the interior of the display containers, such as those shown in FIGURES 1, 2 and 3, or 6 and 7, showing the coiled compression spring which represents the body of the hair roller, the coiled compression spring being readily bent about its longitudinal axis, while the individual coils of the coil spring retain the roller substantially rigid about its circumferential outer surface, a coarsely woven fabric mesh being wrapped around the circumferential outer surface and the interior of the coils of the coiled compression spring. The hair roller represents one type of axially flexible tubular object which may be inserted into the interior of the containers, as contrasted with the axially rigid tubular object shown in FIGURES 13, 14 and 16.

The container shown in FIGURES 1, 2 and 3, which is of substantially rectangular cross-section, as shown in FIGURE 4, comprises a front panel 16, of substantially rectangular contour, a rear panel 17, parallel to and of substantially the same size and contour as the front panel, and a pair of side panels 18, 19 integral with the sides of the front and rear panels and substantially perpendicular thereto, the depth of the side panels being slightly less than the diameter of each of the axially flexible tubular objects fitted thereto, as shown in FIGURE 17, for reasons hereinafter described in greater detail. An auxiliary rear panel 20 integral with one of the side panels, abuts the inner surface of the rear panel, and is fixedly attached thereto, to form the hollow tubular container, of rectangular cross-section, as shown in FIGURES 1, 2 and 4.

The actual method of supporting the various panels of the container may be varied, depending upon the size of the container, and the thickness of the material, of which it is made.

Each of the containers is adapted to support and display two or more axially flexible tubular objects 15, which are relatively rigid circumferentially, in the manner shown in FIGURES 1 and 2.

The front panel 16 has a plurality of substantially rectangular cutouts 21, 21a therethrough, the cutouts 21, 21a, the length of which is substantially equal to the overall inner width of the front panel, being equally spaced relative to one another, each cutout being axially aligned with one of the cylindrical objects 15 which is fitted to the interior of the container.

The width of each of the cutouts, in a direction perpendicular to the axes of the tubular objects inserted in the container, is less than the diameter of the tubular, or cylindrical object, the width of each cutout being substantially equal to the chord of the cylindrical object at the line of engagement with the inner surface of the front panel 16, so that the edges of the front panel, adjacent each cutout, serve to engage the circumferential outer surface of the tubular or cylindrical object 15, and thereby retain the tubular or cylindrical object within the container.

Each side panel 18, 19 has a plurality of arcuate slots 22, 22a, therethrough, which are aligned with and equal in width to the width of the rectangular cutouts 21, 21a through the front panel 16.

The rear panel 17 has a plurality of relatively short parallel-edged filler openings 24, 24a therethrough, the filler openings 24, 24a being located adjacent one of the side panels 18, 19 and axially aligned with the rectangular cutouts 21, 21a through the front panel.

The width of each of the filler openings 24, 24a is somewhat greater than the diameter of the tubular object 15 inserted therethrough, the longitudinally inner edge 25, of the filler opening located a distance from the side panel 18, which is greater than the diameter of the tubular object 15, being of substantially semi-circular or other arcuate contour, as shown in FIGURE 3.

The side panel 18, which is located adjacent the filler openings 24, 24a, has a plurality of arcuate auxiliary slots 26, 26a, therethrough, the arcuate auxiliary slots being in substantial alignment with the arcuate slots 22, 22a, located adjacent the front edge of the side panel 18.

FIGURE 4 shows the method of inserting one of the axially flexible tubular object 15, such as that shown in FIGURE 17, into the rectangular container, shown in FIGURES 1 and 2.

The spacing between the side panels 18, 19 of the container, is slightly greater than the overall length of each tubular object 15, so that in the inserted position, shown by dot-dash lines in FIGURE 4, there is a narrow gap between the side panel and the adjacent end of the tubular object.

In order to insert an axially flexible tubular object 15, such as that shown in FIGURE 17, into a container of the type shown in FIGURES 1, 2 and 3, the container is placed in substantially the position shown in FIGURE 4, with the rear panel 17, which has the filler openings 24, 24a therethrough, located at the top.

One end of the tubular object is inserted through the filler opening 24, 24a and gradually tilted into a position, such as that shown in FIGURE 4, the tubular object being moved into the container until the circumferential outer surface of the lower edge of the tubular object reaches the sides of the corresponding rectangular cutout 21, 21a through the front panel 16.

After the outer circumference of the tubular object 15 reaches the inner edge of the arcuate auxiliary slot 26, 26a, through the side panel, the projecting portion of the tubular, or cylindrical object is tilted to some extent into a position similar to that shown in FIGURE 4, the circumferential outer edge of the longitudinally arcuate portion of the tubular object engaging the inner surface of the rear panel 17, and displacing it slightly along an arcuate line, into substantially the position shown in FIGURE 4.

As a portion of the rear panel 17 is displaced or elevated slightly, it draws the adjacent edges of the two side panels 18, 19 inward, until they assume angular positions similar to those shown in FIGURE 4.

The lower edge 27 of the tubular, or cylindrical object is progressively moved into the container until it reaches the inserted position shown in FIGURES 1 and 2, and in dot-dash lines in FIGURE 4, the circumferential outer edge of the tubular object, engaging the inner surface of the rear panel 17 over substantially the entire length of the tubular object, so that a portion of the circumferential outer surface of the diametrically opposite edge of the tubular, or cylindrical object 15, projects through one of the rectangular cutouts 21, 21a, in the position shown in FIGURE 2, which is the normal position of the tubular object within the container.

In order to reduce the degree of distortion of the modified rear panel 28, such as that shown in FIGURE 5, the modified filler opening 29 is lengthened to some extent over that shown in FIGURES 3 and 4, the contour of the inner edge of the filler opening 28, 28a remaining substantially the same.

Due to the greater length of the modified filler opening shown in FIGURE 5, the rear panel is distorted to a lesser degree when the tubular, or cylindrical object is inserted through the modified filler opening 29, than that shown in FIGURE 4.

The process of inserting the tubular, or cylindrical object 15 into the container is substantially the same as that shown in FIGURE 4. When the tubular, or cylindrical object reaches its fully inserted position, the modified rear panel 28 is restored to its normal position shown by dot-dash lines, FIGURE 5, the circumferential outer surface of the tubular object engaging the inner surface of the rear panel over its entire length.

Figures 6, 7:
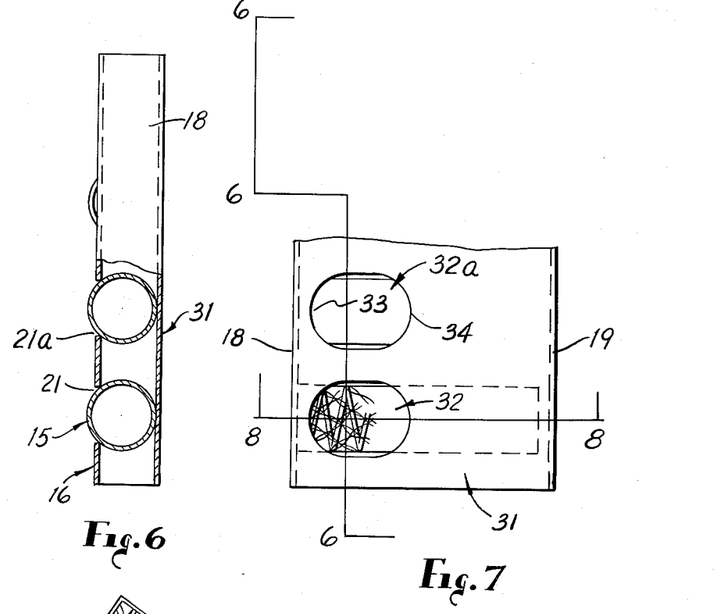
FIGURE 6 is a partial vertical section, and partial side elevational view, similar to FIGURE 2, of a modification of the display container, which is shown in FIGURES 7 and 8, showing the relation between the axially flexible tubular object and the front panel of the container, in the inserted position similar to that shown in FIGURE 2, the view and section being taken on the line 6—6, FIGURE 7.
FIGURE 7 is a rear elevational view, similar to FIGURE 3, of the rear panel of the modified display container shown in FIGURES 6 and 8, the filler opening through the rear panel, through which the tubular object is inserted into the container, being of parallel-faced oval contour, with the edge of the filler opening, located near the side panel, located a short distance from the adjacent side panel, to provide additional support for the tubular object in its inserted position, shown in hidden or dash lines, in FIGURE 7, and in dot-dash lines in FIGURE 8.

FIGURES 6 and 7 show a modification of the display container construction, shown in FIGURES 1, 2 and 3.

In this construction, the rear panel 31 is substantially the same as that shown in FIGURES 3 and 4, except that the filler openings 32, 32a through the rear panel are moved away from the side panel 18, and the arcuate slots through the side panel 18 are eliminated.

Each of these filler openings is of parallel-edged oval contour, with arcuate or substantially semi-circular ends, the distance between one arcuate end 33 of the filler opening and the adjacent side panel providing a support area which serves to retain the adjacent end of one tubular, or cylindrical object 15 within the container.

Figure 8:
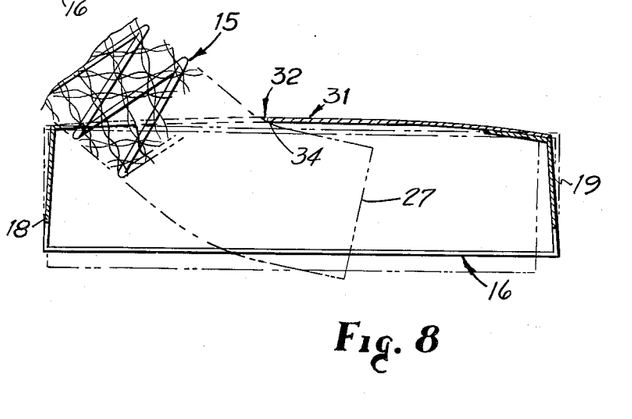

In all other respects, the container shown in FIGURES 6, 7 and 8, is substantially the same as that shown in FIGURES 1, 2, 3 and 4.

In order to insert one of the tubular, or cylindrical objects 15 into the modified container, shown in FIGURES 6 and 7, the container is placed in substantially the position, shown in FIGURE 8, the rear panel 31 being located in the upper position.

One end of the tubular, or cylindrical object is inserted through the filler opening 32, in substantially the same manner as that shown in FIGURE 4, the tubular object being tilted relative to the rear panel, and pushed inward until the circumferential outer surface of the lower edge 27 of the tubular, or cylindrical object passes through one of the rectangular cutouts 21, 21a through the front panel 16, and projects slightly therethrough, after which the portion of the tubular object projecting beyond the rear panel is tilted axially relative to the lower portion thereof, into a position similar to that shown in FIGURE 8, the circumferential outer surface of the tubular object engaging the arcuate inner edge 34 of the filler opening.

The circumferential outer surface of the tubular, or cylindrical object in engagement with the inner surface of the rear panel, adjacent the edge 34 of the filler opening, located a distance from the side panel 18, elevates the portion of the rear panel extending from the side panel 19 to the edge 34 of the filler opening 32, into substantially the position shown in FIGURE 8, the side panels 18, 19 being simultaneously drawn into their respective canted positions shown in FIGURE 8.

The tubular, or cylindrical object is progressively fed into the container, through the filler opening, the degree of elevation of the rear panel from its normal position being progressively varied as the angular displacement of the projecting portion of the tubular, or cylindrical object is varied.

After the tubular, or cylindrical object 15 is completely inserted into the container, it assumes a position substantially as shown in FIGURES 6, 7, and in dot-dash lines in FIGURE 8, the rear panel 31 of the container reassuming its normal relatively flat position, shown by dot-dash lines, FIGURE 8.

In this position, the portion of the rear panel 31, extending from the side panel 18 to the filler opening 32, engages the adjacent end of the tubular, or cylindrical object and assists in retaining it within the container.

Figures 9, 10, 11, 11A:
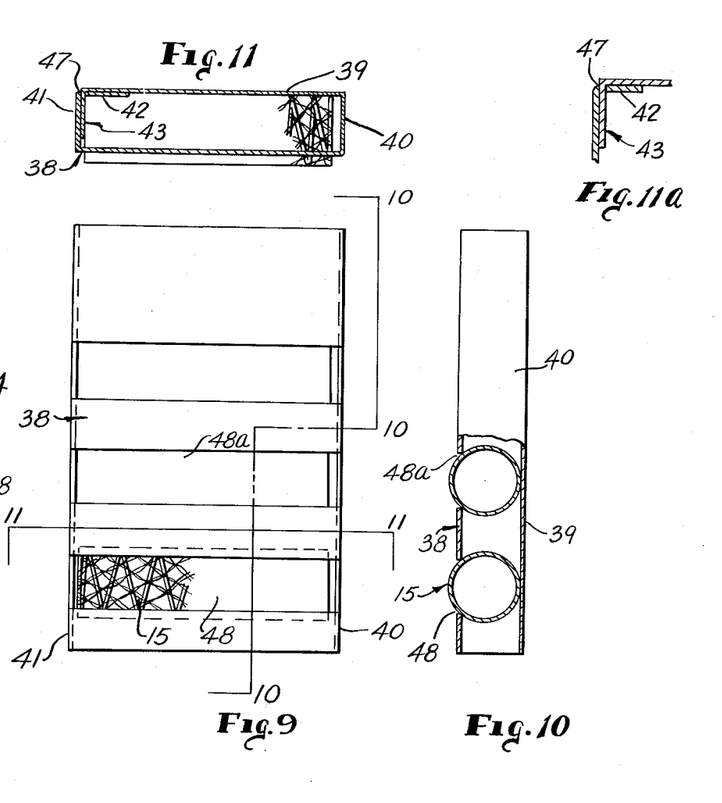
FIGURE 9 is a front elevational view, similar to FIGURE 1, of another modification of the display container, as shown in FIGURES 10, 11 and 12, which is adapted to receive a plurality of axially flexible tubular objects, such as that shown in FIGURE 17, showing a portion of the circumferential outer surface of each of the axially flexible tubular objects projecting through one of the rectangular cutouts through the front panel.
FIGURE 10 is a partial longitudinal section and partial side elevational view, similar to FIGURE 2, of the modified display container shown in FIGURES 9, 11 and 12, showing the method of spacing the tubular objects relative to one another, by means of the sides of the rectangular cutouts through the front panel of the container, the view and section being taken on the line 10—10, FIGURE 9.
FIGURE 11 is a cross-section through the display container, shown in FIGURES 9 and 10, showing one of the two side flaps, integral with the rear panel, each of which is inserted through a slit through the fold line between the auxiliary rear panel, and the adjacent side panel, to retain the display container in its closed position, around the tubular objects, one of which is shown in its inserted position, the section being taken on the line 11—11, FIGURE 9.
FIGURE 11a is a detailed view of the side flaps shown in FIGURE 11.
Figures 13, 14:
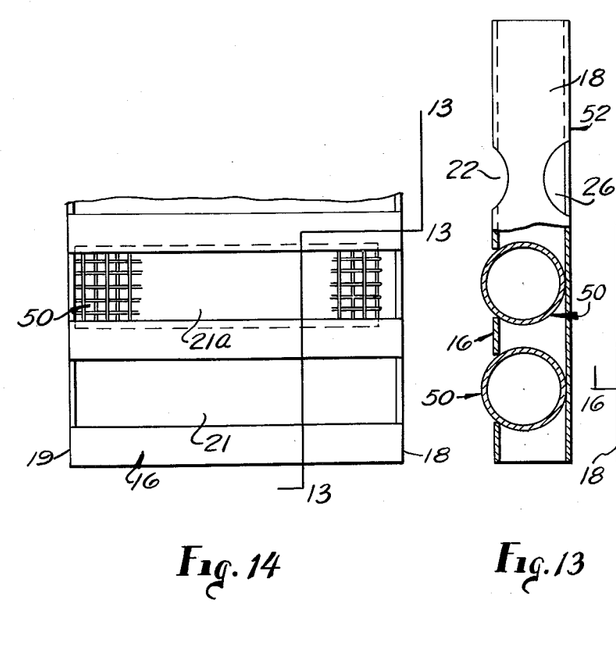
FIGURE 14 is a partial front elevational view, similar to FIGURE 1, of the modified display container shown in FIGURES 13 and 15, showing the cutouts of rectangular contour through the front panel of the container, and a portion of the circumferential outer surface of each of the axially rigid tubular objects projecting through the rectangular cutouts, beyond the outer surface of the front panel of the container.
Figure 16:
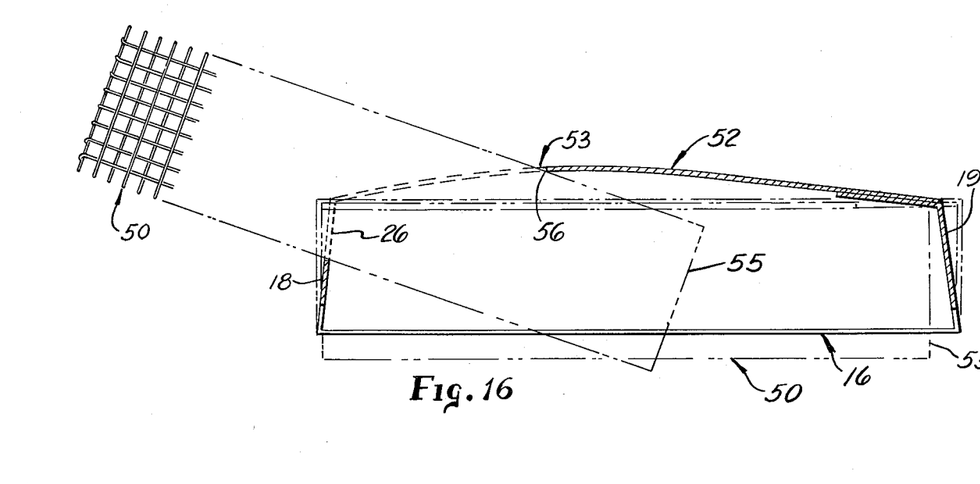

FIGURES 9, 10 and 11 show another modification of the display container shown in FIGURES 1, 2 and 3, the container being utilized for receiving and retaining a plurality of tubular, or cylindrical objects 15, such as those shown in FIGURE 17, or any other type of tubular, or cylindrical object, regardless of whether it is axially rigid, such as that shown in FIGURES 14 and 16, or axially flexible, as shown in FIGURES 4 and 17.

This type of display container, which is also of hollow substantially rectangular cross-section, as shown in FIGURE 11, comprises a front panel 38, which is similar to that shown in FIGURE 1, a rear panel 39, which is parallel to and of substantially the same contour as the front panel, and a pair of side panels 40, 41 integral with the sides of either the front or the rear panel 39, and substantially perpendicular thereto.

In addition to the outer panels shown in FIGURE 11, a relatively short auxiliary rear panel 42, integral with the side panel 41, may be located at the rear edge of the side panel, in substantial engagement with the inner surface of the rear panel 39, which is substantially flat and continuous. A pair of side flaps 43, 43a, is integral with one edge of the rear panel and substantially perpendicular thereto, the side flaps 43, 43a being of basically rectangular contour, as shown in FIGURE 12, the free edge of each of the side flaps having a pair of rounded corners 44, of arcuate contour thereon, the sides 45, 45a of each of the side flaps being tapered slightly from the arcuate corners 44, 44a to the junction with the fold line between each side flap 43, 43a and the rear panel 39.

The fold line between the side panel 41, and the auxiliary rear panel 42 has a pair of relatively thin slits 47, 47a therethrough, the length of the slits being slightly longer than the length of each of the side flaps 43, 43a, the slits being spacedly located relative to one another and individually aligned with the side flaps 43, 43a.

The front panel 38 has a plurality of equally-spaced substantially rectangular cutouts 48, 48a therethrough, the cutouts being substantially the same as those shown in FIGURES 1 and 2, and spaced relative to one another in substantially the same manner, each of the cutouts being axially aligned with one of the axially flexible tubular objects 15, such as those shown in FIGURES 1, 2, 4 and 17, or a substantially rigid tubular object 50, such as those shown in FIGURES 14 and 16.

Figure 12:
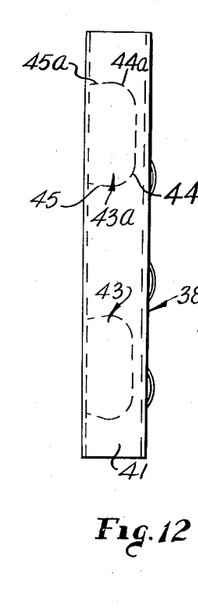
FIGURE 12 is a side elevational view of the display container shown in FIGURES 9 and 10, in its closed position, showing the side panel, the two side flaps, shown in FIGURE 11, which are inserted through the corresponding slits, through the fold line of the panels, the two side flaps engaging the inner surface of the side panel, to retain the display container in its closed position around the tubular objects.

The container shown in FIGURES 9, 11 and 12 is supplied as a substantially flat blank, having the various panels and flaps integral therewith, with creases formed along the fold lines between the various adjoining panels shown in FIGURE 11.

A plurality of axially flexible tubular objects 15, or substantially rigid tubular objects 50, is inserted into the open container, shown in FIGURE 9, the tubular objects being axially aligned with the various rectangular cutouts through the front panel, shown in FIGURE 9. Either before or after all of the tubular, or cylindrical objects are fitted to the cutouts 48, 48a, through the front panel 38, the side panels 40, 41, are folded into their respective positions shown in FIGURE 11, the rear panel 39, which is blank, being folded over the outer surface of the cylindrical objects fitted to the container, the rear panel being angularly disposed relative to the front panel, the edge of the rear panel, which has the two side flaps 43, 43a integral therewith, being spacedly located relative to the auxiliary rear panel 42.

The two side flaps 43, 43a, which are folded into a position, substantially perpendicular to the rear panel 39, are inserted through the slits 47, 47a through the fold line between the side panel 41 and the auxiliary rear panel 42, until the inner surface of the rear panel 39 engages the mating surface of the auxiliary rear panel, the panels assuming the relative positions shown in FIGURE 11, which are substantially the same as those shown in FIGURE 4.

Except for the means of inserting the tubular, or cylindrical objects 15 into the container, the display container shown in FIGURE 10 is substantially the same as those shown in FIGURES 1, 2 and 4.

Due to the fact that the panels of the container shown in FIGURE 11 are folded around the tubular or cylindrical objects, the container shown in FIGURE 11 may be utilized in conjunction with axially flexible cylindrical objects 15, such as that shown in FIGURES 4 and 17, or relatively rigid tubular objects 50, such as that shown in FIGURES 14 and 16.

The front panel 16 and the two side panels 18, 19 are substantially the same as those shown in FIGURES 1, 2 and 4. The rear panel 52 has a plurality of parallel-edged filler openings 53, 53a therethrough, the filler openings, which are similar to those shown in FIGURE 3, being longer than the diameter of the substantially rigid tubular object 50, such as that shown in FIGURE 16, which is fitted to the interior of the container. The side panel 18, which is integral with and located adjacent one side of the rear panel 52, has a plurality of arcuate slots 26, 26a therethrough, each of the arcuate slots being aligned with one of the filler openings 53, 53a through the rear panel 52.

In order to insert a circumferentially and axially substantially rigid tubular, or cylindrical object through one of the filler openings 53, 53a through the rear panel 52 of the container, the container is placed in substantially the position shown in FIGURE 16, with the rear panel 52 located in the upper position.

One of the axially rigid tubular objects 50, such as that shown in FIGURE 16, is inserted through one of the filler openings 53, 53a, and the tubular object tilted into a position similar to that shown in FIGURE 16, with the outer circumference of the tubular object in engagement with the lower edge of the arcuate slot 26 through the side panel 18.

The tubular object is slid along the front panel 16 of the container, until the lower edge 55, of the tubular object passes through the aligned rectangular cutout through the front panel 16, the circumferential surface of the lower edge 55 of the tubular object engaging the edges of the front panel, at both edges of one of the rectangular cutouts 21, 21a through the front panel.

In the tilted position of the rigid tubular object 50, the longitudinal axis of which is substantially straight, the circumferential outer surface of the tubular object, which is in engagement with the inner surface of the rear panel 52, displaces the portion of the rear panel 52 extending from the arcuate edge 56 of the filler opening 53, to the side panel 19, to an arcuate angularly displaced position substantially as shown in FIGURE 16, the other portion of the rear panel, extending from the arcuate edge 56 of the filler opening 53, 53a to the adjacent side panel 18 being similarly angularly displaced.

The displacement of the respective portions of the rear panel, relative to the front panel 16, draws the adjacent edges of the side panels 18, 19 angularly inward, thereby tilting the side panels 18, 19 into the canted positions substantially as shown in FIGURE 16.

As the substantially rigid tubular object 50 is progressively fed into the modified container, the angle between the longitudinal axis of the tubular object and the position of the front panel 16 is continuously reduced from the peak angle reached at one point during the process of the insertion of the tubular object into the container. The alteration of the angular position of the tubular object, relative to the front panel, progressively reduces the extent of the angular displacement of portions of the rear panel, until the rigid tubular object 50 is fully inserted into the container, the inner surface of the rear panel 52 engaging the outer circumference of the tubular object in substantially the position shown by dot-dash lines, FIGURE 16.

The width of the container between the side panels 18, 19 is somewhat longer than the overall length of the tubular or cylindrical object, to allow the tubular, or cylindrical object, in its tilted position, to fully enter the interior of the container, without distorting the side panels 18, 19 thereof except for the canting shown in FIGURE 16.

In its fully inserted position, shown in FIGURE 13, and in dot-dash lines FIGURE 16, a portion of the circumferential outer surface of the tubular object projects through the rectangular slot 21, 21a, beyond the outer surface of the front panel 16, in substantially the same manner as those shown in FIGURE 2.

While the tubular object 50, shown in FIGURE 16, is formed of a fairly rigid wire structure, it may be in the form of a continuous metal tube, a seamless tube, or a bar made of solid material, the means of mounting the tubular, or cylindrical object within the container, and the method of insertion of such tubular, or cylindrical object into the container, being substantially the same as that for the formed wire tube, shown in FIGURE 16, the longitudinal axis of the tubular, or cylindrical object being substantially straight and rigid, the outer diameter of the tubular, or cylindrical object also being substantially constant and rigid over its entire length.

While the display container shown in FIGURES 1, 2, 3 and 4, and the modified display containers shown in FIGURES 6, 7 and 8 may be used with any type of tubular or cylindrical object which is fairly rigidly circumferentially, although it may be bent to any required degree along an arcuate line in order to enable it to be inserted through the filler opening through one panel of the container, in the manner hereinbefore described, they are shown with axially flexible hair rollers 15 such as that shown in detail FIGURE 17, fitted thereto.

The hair roller 15 shown in FIGURE 17, comprises a coiled compression spring 58 formed of relative fine wire of substantially circular cross-section, the end coils 59 of the spring being fully compressed or closed, with a wrapping 60, formed of a coarse mesh fabric net, or other suitable material, which is adapted to prevent the hair or similar material being caught between the coils of the spring 58, fitted around the compression spring, and optionally around the inner circumference of the coils.

FIGURE 17 is merely indicative of one type of axially flexible tubular object, which may be fitted to the various types of containers.

Figure 15:
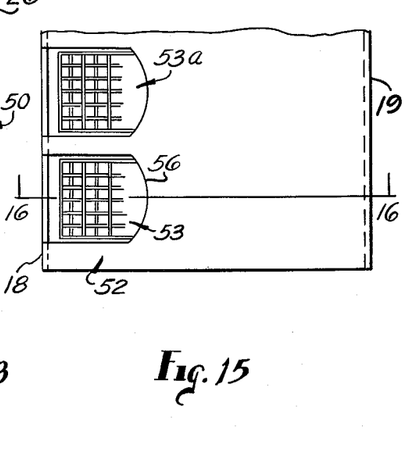
FIGURE 15 is a rear elevational view, similar to FIGURE 3, of the modified display container, shown in FIGURES 13 and 14, showing the short parallel-edged filler openings through the rear panel of the container, through which the axially rigid tubular objects are individually inserted into the interior of the container, in the manner shown in FIGURE 16, a portion of one end of each of the tubular objects being shown extending through one of the filler openings at the right-hand side, FIGURE 15.

The container shown in FIGURES 13, 14 and 15 is adapted to receive tubular or cylindrical objects, which are fairly rigid, both axially and circumferentially.

One tubular object 50 of this type, which is also used as a hair roller, is shown in FIGURES 14 and 16. This type of hair roller is formed of a wire mesh sheet which is wrapped, or rolled to the required diameter, and joined along the axial seam thereof by brazing, soldering or other suitable attaching means, to form a continuous substantially rigid tube.

This is merely illustrative of one type of tubular object, as substantially the same type of container may be utilized with any type of tubular, or cylindrical object, such as welded or seamless tubing, as long as the outside diameter, and the length of the tubular object, are substantially the same as those shown in FIGURES 13, 14 and 16 of the drawings.

The modified container shown in FIGURES 9, 10, 11 and 12 can be utilized with either type of tubular, or cylindrical object.

The various types of display container shown in FIGURES 1, 2 and 4 of the drawings, and the various modifications thereof, may be utilized with any reasonable size of tubular or cylindrical object, the overall width of the container being slightly greater than the length of the tubular objects which are fitted thereto.

The depth of the display container, between the front and rear panels thereof, is less than the outside diameter of the tubular objects fitted thereto, thus enabling a portion of the circumferential outer surface of the tubular object to project through one of the rectangular cutouts 48, 48a, beyond the front panel of the container.

The width of the rectangular cutouts 48, 48a, through the front panel of the container, is substantially equal to the width of a chord of the outer circumference of the tubular object at the point of engagement with the inner surface of the front panel.

The width of the filler opening 24, 32, 53 in each of the containers shown in the drawings, is somewhat greater than the outer diameter of the tubular object, to enable the tubular object to be freely inserted therethrough in the manner shown in FIGURES 4, 5 and 8.

The cross-sectional dimensions of the modified display container shown in FIGURES 13, 14, 15 and 16, are substantially the same as those in FIGURES 1, 2 and 3, assuming the same size of tubular object, substantially the same proportions of the width of the rectangular cutouts, and the width of the filler openings relative to the corresponding dimensions of the tubular object, being maintained.

While the display containers shown in FIGURES 1, 2, 3 and 4, and the various modified display containers shown in the other figures of the drawings, are formed by folding the various panels of the container relative to one another and attaching an auxiliary panel to the inner surface of one of the outer panels, this is merely one representative form of container construction, other suitable panel construction means being adaptable to the same operating features.

Any other type of panel attachment can be utilized, depending upon the material used, and manufacturing considerations, provided the completed display container is of hollow rectangular cross-section, substantially as shown in FIGURES 4, 5, 8 and 16.

While the various axially flexible and axially rigid tubular, or cylindrical objects, shown in the drawings, are all of substantially circular cross-section, essentially the same types of display container may be utilized with tubular, or cylindrical objects of regular polygonal or oval cross-section, provided the tubular object has essentially the characteristics hereinbefore described with regard to the axially flexible or substantially rigid features of the tubular objects.

While the display containers shown in the drawings are shown essentially as sleeves of substantially rectangular cross-section, with both ends fully open, essentially the same type of container having insert flaps integral with the front or rear panels of the container may be utilized, to provide a container with a fully enclosed interior.

Where a closed display container fitted with end insert flaps is utilized, it may be necessary, when inserting the tubular objects into the container in the manner shown in FIGURES 4, 5 and 8, to leave the end flaps open, while the tubular objects are inserted through the filler openings, to enable the front or rear panels of the container to flex, and the side panels thereof to be angularly displaced in the manner shown in FIGURES 4, 5 and 8, without disturbing the end flaps.

While the display containers shown in FIGURES 1, 2 and 3, and the various modifications thereof, are shown with three or four rectangular cutouts, through the front panel, to receive the same number of tubular objects, the number of rectangular cutouts may be increased or decreased to any required number, depending upon the size of the tubular object, and the overall length of container desired. While the rectangular cutouts are cut through the front panel of the containers shown in the drawings, and the filler openings through the rear panel thereof, this arrangement can be reversed without affecting the construction or the method of utilization of the display container.

The display containers may be made of relatively thin semi-rigid coated paper, or of a thin sheet of plastic material, of any suitable type, provided only that the material utilized has a high enough degree of flexibility to enable portions of the rear panel to be flexed, or distorted to the extent shown in FIGURES 4, 5, 8 and 16, without creasing or cracking the sheet material, or permanently distorting it.

It will be apparent to those skilled in the art that the present invention is not limited to the specific details described above and shown in the drawings, and that various further modifications are possible in carrying out the features of the invention and the construction, fitting, and the method of filling and utilization thereof, without departing from the spirit and scope of the appended claims.

What is claimed is:

1. A display container made of relatively thin sheet material for supporting a plurality of objects of substantially tubular form, comprising a front panel, a rear panel substantially parallel to the front panel and spacedly located relative thereto, and a pair of side panels fixedly attached to the sides of the front and rear panels and extending therebetween, substantially prependicularly thereto, the front panel having a plurality of substantially parallel cutouts of substantially rectangular contour therethrough, each of said cutouts being adapted to allow a portion of the cylindrical outer surface of one of the tubular objects located within the container to project therethrough, the rear panel having a plurality of filler openings therethrough, each of said filler openings being in substantially axial alignment with a portion of one of the cutouts through the front panel, each of said filler openings through the rear panel being wider than the cutouts in said front panel, the filler openings through the rear panel being located adjacent one of the side panels, said filler openings having a length less than one-half the width of said rear panel, the side panel adjacent the filler openings having a plurality of slots of arcuate contour therethrough, each of said arcuate slots being in substantial alignment with and a substantial continuation of the adjacent filler openings, the rectangular cutouts through the front panel extending over substantially the entire width of the front panel, between the side panels thereof, the width of each of said rectangular cutouts along a plane substantially parallel to the side panels being less than the outer diameter of each of the tubular objects fitted to the container, the edges of the front panel adjacent each rectangular cutout being adapted to engage the circumferential outer surface of one of the tubular objects, to retain the corresponding tubular objects within the container.

2. A display container made of relatively thin sheet material, for supporting a plurality of objects of substantially tubular form, comprising a front panel, a rear panel substantially parallel to the front panel and spacedly located relative thereto, and a pair of side panels fixedly attached to the sides of the front and rear panels and extending therebetween, substantially perpendicularly thereto, the front panel having a plurality of substantially parallel cutouts of substantially rectangular contour therethrough, each of said cutouts being adapted to allow a portion of the cylindrical outer surface of one of the tubular objects located within the container to project therethrough, the rear panel having a plurality of filler openings therethrough, each of said filler openings being in substantially axial alignment with a portion of one of the cutouts through the front panel, each of said filler openings through the rear panel being wider than the tubular object, the filler openings through the rear panel being located adjacent one of the side panels, the side panel adjacent the filler openings having a plurality of slots of arcuate contour therethrough, each of said arcuate slots being in substantial alignment with and a substantial continuation of the adjacent filler opening, the filler openings being located a relatively short distance from one of the side panels, one edge of each filler opening being located a short distance from the side panel of the container, the length of each filler opening being less than one-half the width of the rear panel.

3. A display container made of relatively thin sheet material, for supporting a plurality of objects of substantially tubular form, comprising a front panel, a rear panel substantially parallel to the front panel and spacedly located relative thereto, and a pair of side panels fixedly attached to the sides of the front and rear panels and extending therebetween, substantially perpendicularly thereto, the front panel having a plurality of substantially parallel cutouts of substantially rectangular contour therethrough, each of said cutouts being adapted to allow a portion of the cylindrical outer surface of one of the tubular objects located within the container to project therethrough, the rear panel having a plurality of filler openings therethrough, each of said filler openings being in substantially axial alignment with a portion of one of the cutouts through the front panel, each of said filler openings through the rear panel being wider than the cutouts through the front panel, the filler openings through the rear panel being located adjacent one of the side panels, the side panel adjacent the filler openings having a plurality of slots of arcuate contour therethrough, each of said arcuate slots being in substantial alignment with and a substantial continuation of the adjacent filler opening, the length of each filler opening being less than one-half the width of said rear panel, the edge of each filler opening located a distance from the side panel adjacent the filler opening, being of arcuate contour, the rectangular cutouts through the front panel extending over substantially the entire width of the front panel, between the side panels thereof, the width of each of said rectangular cutouts along a plane substantially parallel to the side panels being less than the outer diameter of each of the tubular objects fitted to the container, the edges of the front panel adjacent each rectangular cutout being adapted to engage the circumferential outer surface of one of the tubular objects, to retain the corresponding tubular object within the container.

4. A display container for supporting a plurality of tubular objects of substantially cylindrical outer contour, said container being formed of relatively thin sheet material and comprising a first longitudinal panel of substantially rectangular form, a second longitudinal panel substantially parallel to the first longitudinal panel, and spacedly located relative thereto, and a pair of side panels fixedly attached to the sides of the first and second longitudinal panels and substantially perpendicular thereto, the first longitudinal panel having a plurality of substantially parallel-edged cutouts therethrough, each of said cutouts being adapted to allow a portion of the circumferential outer surface of one of the cylindrical objects located within the container to project therethrough, the second longitudinal panel having a plurality of substantially parallel-sided filler openings therethrough, each of said filler openings being in substantially axial alignment with a portion of one of the rectangular cutouts through the first longitudinal panel, each of said filler openings through the second longitudinal panel being located adjacent one of the side panels, the width of each of said filler openings being greater than the width of the cutouts through the first longitudinal panel, the length of each of said filler openings being less than one-half the width of the second panel, the side panel adjacent the filler opening having a plurality of slots of arcuate contour therethrough, each of said arcuate slots being in substantial alignment with and a substantial continuation of one of the filler openings, the rectangular cutouts through the first longitudinal panel extending over substantially the entire width of the first longitudinal panel, between the side panels thereof, the width of each of the rectangular cutouts along a plane substantially parallel to the side panels being less than the outer diameter of each of the tubular objects fitted to the container, the edges of the first longitudinal panel adjacent each cutout being adapted to engage the circumferential outer surface of one of the tubular objects, to retain the corresponding tubular object within the container.

5. A display container made of relatively thin sheet material, for supporting a plurality of objects of substantially tubular form, comprising a front panel, a rear panel substantially parallel to the front panel and spacedly located relative thereto, and a pair of side panels fixedly attached to the sides of the front and rear panels and extending therebetween, substantially perpendicular thereto, the front panel having a plurality of substantially parallel cutouts of substantially rectangular contour therethrough, each of said cutouts being adapted to allow a portion of the cylindrical outer surface of one of the tubular objects located within the container to project therethrough, the rear panel having a plurality of filler openings therethrough, each of said filler openings being in substantially axial alignment with a portion of one of the cutouts through the front panel, the filler openings being located a relatively short distance from one of the side panels, one edge of each filler opening being located a short distance from the side panel, the axial length of each filler opening being less than one-half the width of the rear panel, the ends of each filler opening being of arcuate contour, the rectangular cutouts through the front panel extending over substantially the entire width of the front panel, between the side panels thereof, the width of each of said rectangular cutouts along a plane substantially parallel to the side panels being less than the outer diameter of each of the tubular objects fitted to the container, the edges of the front panel adjacent each rectangular cutout being adapted to engage the circumferential outer surface of one of the tubular objects, to retain the corresponding tubular objects within the container.

6. A display container made of thin relatively flexible sheet material, for supporting a plurality of substantially cylindrical objects, comprising a front panel of substantially rectangular contour, a rear panel substantially parallel to the front panel and spacedly located relative thereto, and a pair of side panels fixedly attached to the sides of the front and rear panels, and extending therebetween, substantially perpendicularly thereto, the front panel having a plurality of substantially parallel cutouts of substantially rectangular contour therethrough, each of said cutouts being adapted to allow a portion of the cylindrical outer surface of one of the cylindrical objects located within the container to project therethrough, the rear panel having a plurality of filler openings therethrough, each of said filler openings being in substantially axial alignment with a portion of one of the rectangular cutouts through the front panel, the width of each of the filler openings being greater than the width of the cutouts through the front panel, the sides of each of the filler openings through the rear panel being substantially parallel to the axis of one of the rectangular cutouts through the front panel, each of the filler openings being located adjacent one of the side panels, the length of each of said filler openings being less than one-half the width of said rear panel, the side panel adjacent the filler openings having a plurality of slots of arcuate contour therethrough, each of said arcuate slots being in substantial alignment with the adjacent filler opening, the edge of each filler opening located a distance from the side panel adjacent the filler opening being of substantially circular segmental contour, the rectangular cutouts through the front panel extending over substantially the entire width of the front panel, between the side panels thereof, the width of each of said rectangular cutouts along a plane substantially parallel to the side panels being less than the outer diameter of each of the tubular objects fitted to the container, the edges of the front panel adjacent each rectangular cutout being adapted to engage the circumferential outer surface of one of the tubular objects, to retain the corresponding tubular object within the container.

References Cited in the file of this patent
UNITED STATES PATENTS

| | | |
|---|---|---|
| 2,242,711 | Oliver | May 20, 1941 |
| 2,828,008 | Fryburger | Mar. 25, 1958 |
| 2,889,957 | Kilmartin | June 9, 1959 |